United States Patent [19]

Boyle, III

[11] Patent Number: 5,509,685

[45] Date of Patent: Apr. 23, 1996

[54] AIR BAG MODULE

[75] Inventor: Walter J. Boyle, III, Lake Orion, Mich.

[73] Assignee: Chrysler Corporation, Auburn Hills, Mich.

[21] Appl. No.: 349,288

[22] Filed: Dec. 5, 1994

[51] Int. Cl.$^6$ ..................................................... B60R 21/16
[52] U.S. Cl. ........................................ 280/728.2; 280/731
[58] Field of Search ................................. 280/728.2, 731

[56] References Cited

U.S. PATENT DOCUMENTS

| 4,183,550 | 1/1980 | Sudou | 280/728.2 |
| 5,174,601 | 12/1992 | Frantz et al. | 280/728.2 |

Primary Examiner—Kenneth R. Rice
Attorney, Agent, or Firm—Edward A. Craig

[57] ABSTRACT

An air bag module comprising an air bag disposed inside a module housing. An air bag inflater extends into the housing through an opening in the housing. The inflater has a flange on the outside of the housing. The air bag has an opening surrounding the inflater. The air bag has a plurality of angularly spaced retainer tabs extending from the opening in the air bag through the opening in the housing and sandwiched between the housing and the inflater flange. Mounting studs are affixed to the housing and extend through the retainer tabs and through the inflater flange. Nuts are threaded onto the studs to secure the inflater flange to the housing and to clamp the tabs between the housing and the flange. The opening in the air bag has marginal edge portions between the tabs which extend through the opening in the housing and are also clamped between the housing and the flange.

2 Claims, 2 Drawing Sheets

AIR BAG MODULE

FIELD OF THE INVENTION

This invention relates generally to air bags and refers more particularly to an air bag module mounted in the steering wheel of an automotive vehicle.

BACKGROUND AND SUMMARY OF THE INVENTION

In prior constructions, the air bag in the steering wheel was secured within a housing by a clamping ring. The inflater was clamped in an opening in the housing by a separate clamp and extended into the air bag. The clamping ring was pre-assembled inside the air bag before the inflater was installed. The ring had a tendency to fall out. To prevent the ring from falling out, it could have been bolted in place but that would have required additional assembly steps.

The present invention dispenses with the need for a clamping ring, thereby eliminating the cost and weight of the ring and the various processing steps associated with the ring. The separate clamp for the inflater is also eliminated.

In the specific construction about to be described, the air bag inflater extends through an opening in a wall of the housing into an opening in the air bag. The inflater has a mounting flange overlapping the outer side of the housing wall. The air bag has a plurality of angularly spaced integral tabs which extend through the opening in the housing and are sandwiched between the inflater flange and the housing wall. Mounting studs affixed to the housing wall extend through the tabs and through the inflater flange to mount the inflater and also retain the air bag. The air bag preferably has marginal edge portions between the tabs which extend through the opening in the housing wall and are also clamped between the flange and the housing. By this construction, the air bag is both retained in position and sealed.

One object of this invention is to provide an air bag module having the foregoing features.

Another object is to provide an air bag module which is composed of a relatively few simple parts, is rugged and durable in use, and is capable of being inexpensively manufactured and readily assembled.

These and other objects, features and advantages of the invention will become more apparent as the following description proceeds, especially when considered with the accompanying claims and drawings.

DETAILED DESCRIPTION OF THE PREFERRED EMBODIMENT

Figure 1:
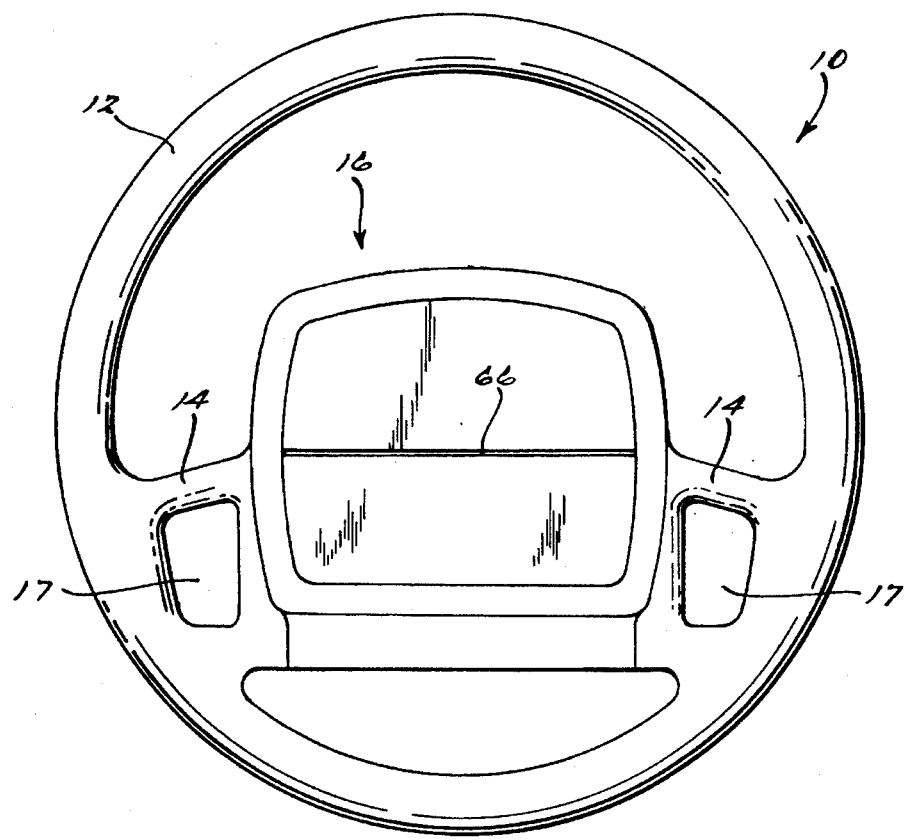
FIG. 1 is a plan view of a steering wheel of an automotive vehicle having an air bag module constructed accordance with this invention.
Figure 2:
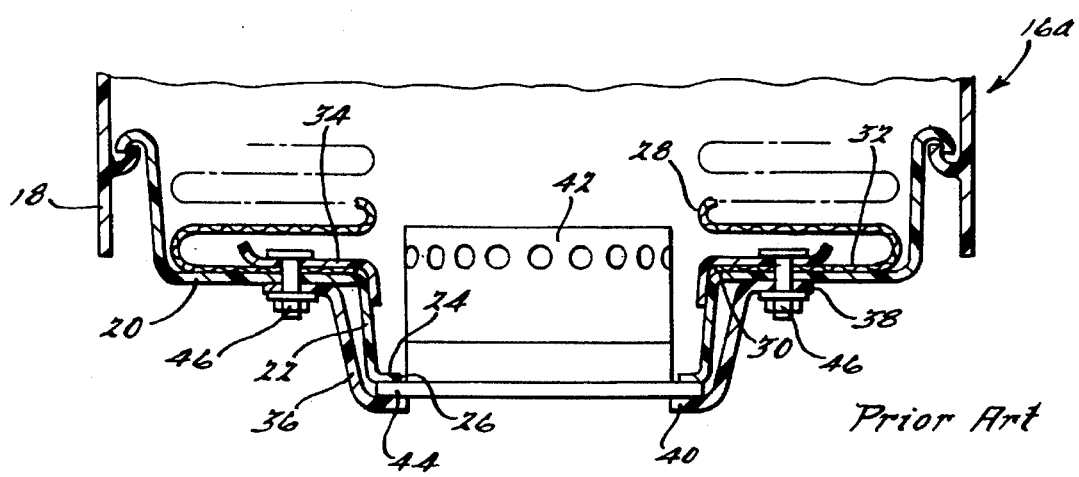
FIG. 2 is a cross-sectional view of an air bag module constructed in accordance with the prior art.
Figure 3:
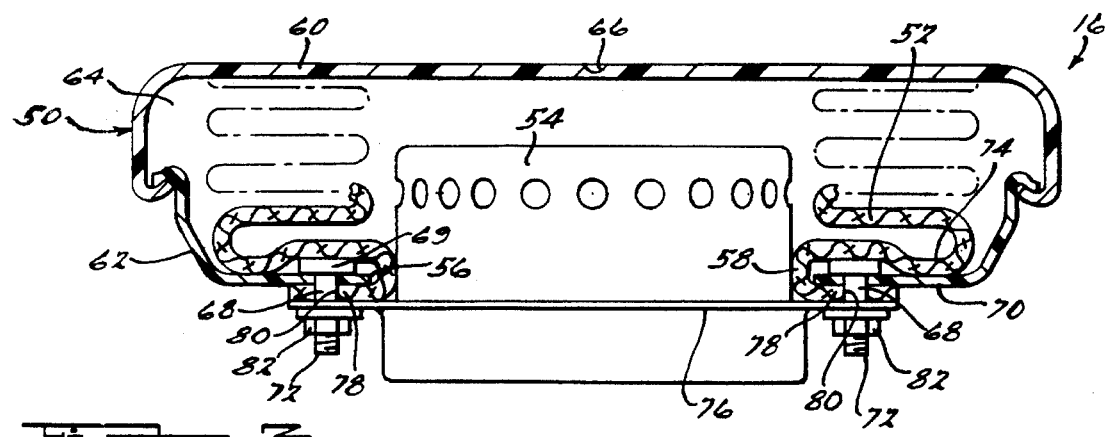
FIG. 3 is a sectional view taken on the line 3—3 in FIG. 1 showing the air bag module of this invention.
Figure 4:
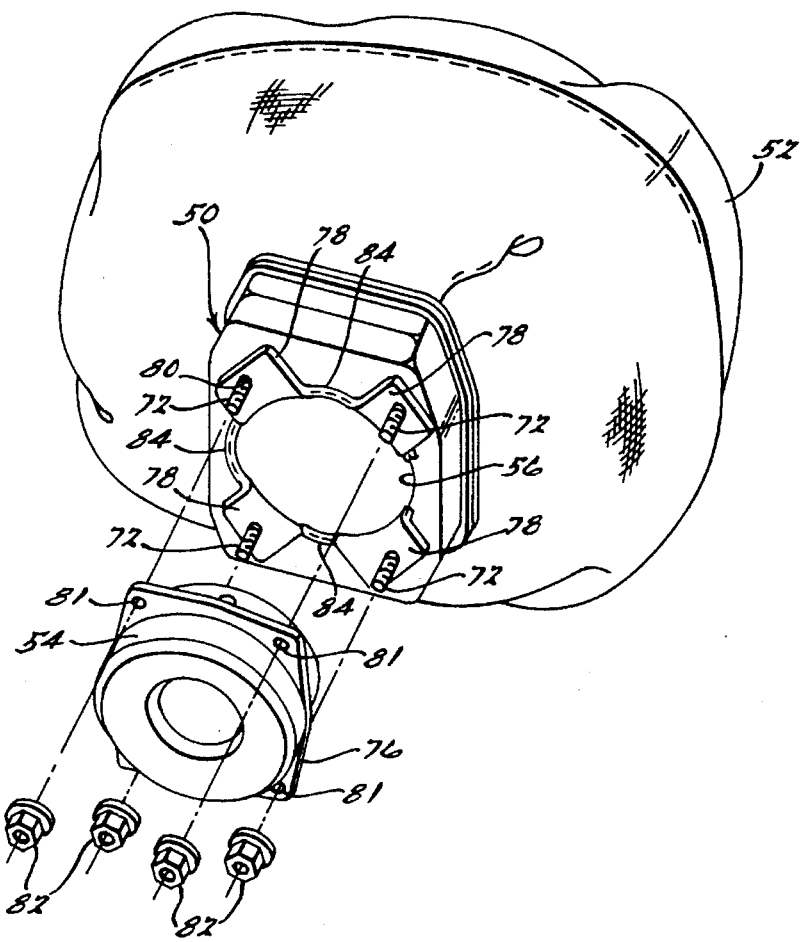
FIG. 4 is an exploded view in perspective of the air bag module of the present invention, showing the air bag inflater separated from the module housing and the air bag inflated.

Referring now more particularly to the drawings and especially to FIG. 1, the steering wheel 10 has a steering ring 12 supported by laterally outwardly extending spokes 14. At the center of the steering wheel is an air bag module 16 constructed in accordance with this invention, with horn buttons 17 at opposite sides thereof. The air bag module 16 is also shown in FIGS. 3 and 4. FIG. 2 shows an air bag module 16a constructed in accordance with the prior art.

The prior art air bag module 16a comprises a module housing 18 having a bottom wall 20 provided with a downturned annular portion 22 terminating in an annular radially inwardly extending terminal portion 24 forming an opening 26. The air bag 28 in the housing has an opening 30 which registers with the opening 26 in the housing. The annular portion 32 of the material of the air bag surrounding its opening 30 rests on the inside of the housing wall. A clamping ring 34 is placed inside the housing and inside the air bag and overlies the portion 32 of air bag material around the opening 30. A clamp 36 has a radially outer annular terminal portion 38 engaging the outside of the bottom wall of the housing, and a radially inner annular terminal portion 40. An inflater 42 extends into the opening 26 in the housing and through the opening 30 in the air bag and has annular flange 44 clamped between the terminal portion 24 of the housing 18 and the terminal portion 40 of the clamp 36. Nut and bolt assemblies 46 extend through the clamping ring 34, the air bag 28, the housing wall 20 and the outer terminal portion 38 of the clamp 36 to secure these parts to the housing wall. One disadvantage of this prior art construction is that the clamping ring 34 has a tendency to fall out of the housing before the module is completely assembled.

Referring now to FIGS. 3 and 4, air bag module 16 of this invention will now be described. The air bag module 16 has a housing 50, an air bag 52 within the housing, and an air bag inflater 54 extending through an opening 56 in the housing and through a registering opening 58 in the air bag.

The housing 50 has a bowl-shaped upper part or cover 60 and a pan-shaped lower part 62 which are marginally secured together and cooperate in defining a chamber 64 for the air bag. The cover 60 may be made of any suitable, reasonably strong and relatively rigid, preferably resinous, material. In this instance, the top wall of the cover has a line 66 of reduced thickness which will tear under the force of impact when the air bag deploys so that the cover material on opposite sides of the tear line will open and spread apart. The housing part 62 is also made of any suitable, reasonably strong and relatively rigid material. The opening 56 is formed centrally in the lower housing part 62.

A plurality of angularly spaced mounting studs 68 extend through and are affixed to the lower housing part 62 in a circle around the opening 56. The heads 69 of the studs are on the inner side of the annular portion 70 of the lower housing part 62 surrounding the opening 56. The threaded shanks 72 of the studs project away from the outer side of the housing part 62 perpendicular thereto.

The air bag 52 is made of any suitable flexible sheet material, such, for example, as nylon. The opening 58 in the air bag registers with the opening 56 in the housing, and the annular portion 74 of the air bag surrounding the opening 58 rests on the inner side of the annular portion 70 of the housing surrounding its opening 56.

The inflater 54 extends into the air bag through the registering openings 56 and 58 in the housing and in the air bag. The inflater has a radially outwardly extending annular flange 76 which overlies the outer side of the annular portion 70 of the housing.

The air bag has a plurality of angularly spaced air bag retainer tabs 78 extending from the edge of the air bag defining the opening 58. The tabs are integral with the air bag and of the same material as the air bag. The tabs extend through the opening 56 in the housing and are folded radially outwardly so as to be sandwiched between the housing and the flange 76 of the inflater 54.

The stud shanks 72 project through the wall of the lower part 62 of the housing, through openings 80 in the tabs 78, and through holes 81 in the inflater flange 76. Nuts 82 threaded on the ends of the shanks 72 clamp the inflater flange 76 to the housing with the tabs 78 clamped or sandwiched therebetween.

Preferably, the marginal edge material 84 of the bag which defines the opening 58 between the tabs 78 is also extended through the housing opening 56 and folded outward between the housing and the inflater flange 76 so that this marginal edge material 84 is likewise clamped and sandwiched between the housing and the inflater flange. Thus, the air bag is not only clamped in position by the retainer tabs 78, but the tabs together with the marginal edge portions 84 of the air bag around the air bag opening 58 provide a complete annular seal for the air bag.

The air bag material between the tabs is cut away to allow the tabs to be folded radially outwardly after having been extended through the housing opening, without stretching or tearing the air bag material.

The studs are affixed to and pre-assembled with the lower part 62 of the housing so that during assembly it is only necessary to place the air bag in the housing through the opening 56 with the air bag opening 58 registering with the housing opening 56, extend the tabs through the housing opening 56 and fold them radially outwardly, with the preformed holes 80 in the tabs fitted on the studs 68, and then install the inflater 54 into the air bag through the registering openings 56 and 58 with the studs extending through the holes 81 in the inflater flange 76. Care should be taken to insure that the marginal edge portions 84 of the air bag opening between the tabs are also extended out through the opening 56 in the housing and sandwiched between the housing and the inflater flange 76. Then when the nuts 82 are threaded on the studs 68 and tightened against the inflater flange, the air bag will be retained and sealed by the tabs and marginal edge portions of the air bag which are sandwiched and clamped between the inflater flange and the housing.

It will thus be seen that the air bag module of this construction eliminates the clamping ring provided inside the housing in the prior art construction and also eliminates the separate clamp required in the prior art to mount the inflater on the housing. Use of the old mounting ring in prior art structures required it to be pre-assembled inside of the bag. This ring had a tendency to drop out after it was inserted. Elimination of the clamping ring reduces the cost of the ring and its weight as well as the processing steps required to pre-assemble it.

What is claimed is:

1. An air bag module adapted to be mounted in the steering wheel of an automotive vehicle comprising a module housing having a wall formed with an opening, an air bag inflater extending into said housing through said opening, said inflater having an annular flange overlapping said housing wall on the outer side thereof around the opening in said housing wall, an air bag made of flexible sheet material and having an opening, said air bag being disposed in said housing with said opening therein surrounding said inflater and registering with the opening in said housing wall, said air bag having retainer means comprising a plurality of angularly spaced tabs integral with and of the same material as said air bag, said tabs extending from said opening in said air bag through said opening in said housing wall and folded radially outwardly so as to be sandwiched between said housing wall and said flange, means for securing said flange to said housing wall with said tabs clamped therebetween, said securing means comprising a plurality of angularly spaced studs secured to said housing wall around the opening therein and extending perpendicularly outwardly from said housing wall through said tabs and through said flange, and nuts threaded on said studs and tightened against said flange.

2. An air bag module as defined in claim 1, wherein the opening in said air bag has marginal edge portions between said tabs which extend through said opening in said housing wall and are folded radially outwardly so as to be sandwiched and clamped between said housing wall and said flange, said tabs and marginal edge portions forming with the wall of said housing and said flange a continuous seal around the opening in the air bag.

\* \* \* \* \*